United States Patent Office 3,294,481
Patented Dec. 27, 1966

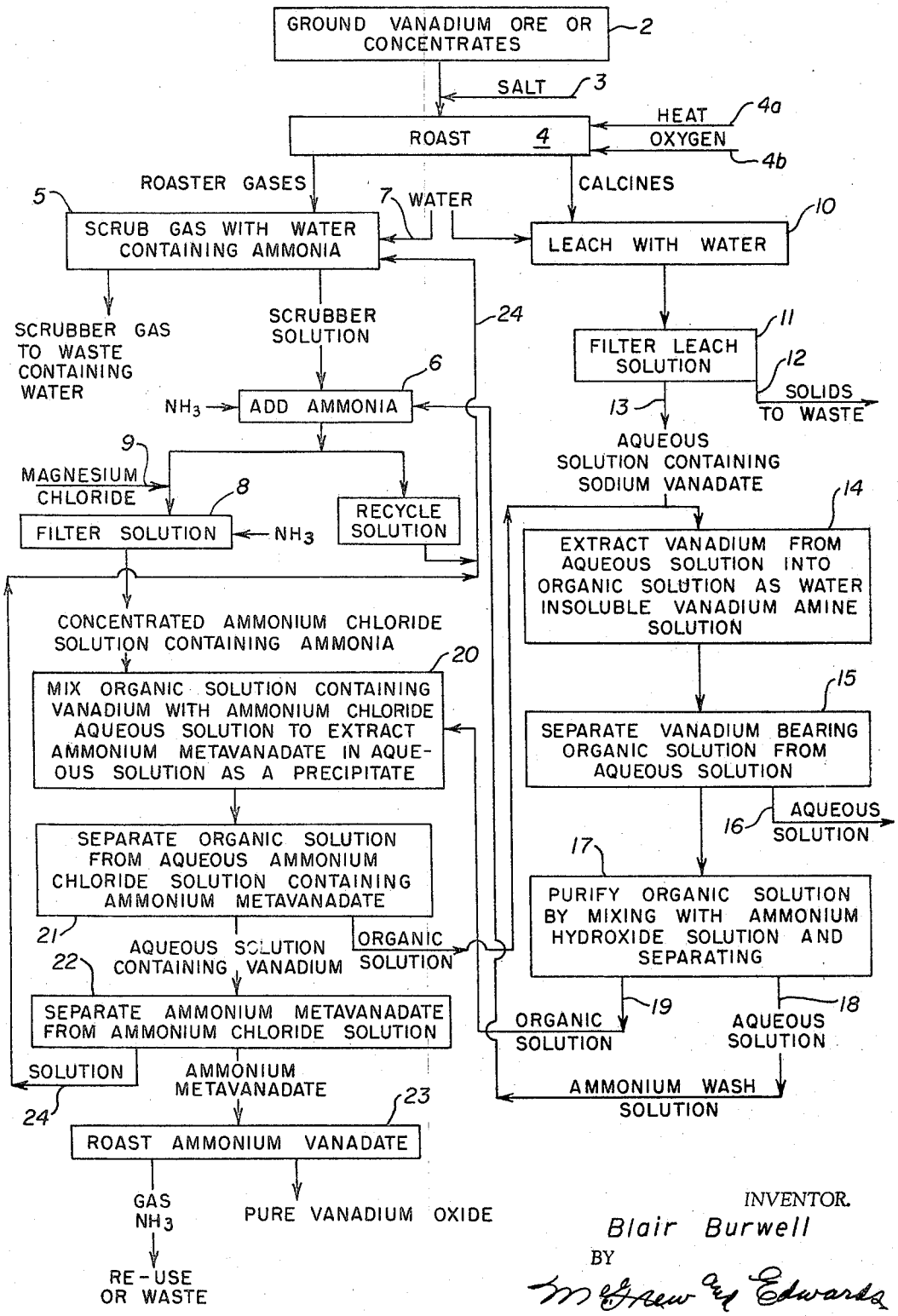

3,294,481
PROCESS FOR RECOVERING PURE VANADIUM
OXIDE FROM LOW GRADE VANADIUM ORES
OR CONCENTRATES
Blair Burwell, P.O. Box 1951,
Grand Junction, Colo. 81501
Filed Dec. 5, 1962, Ser. No. 242,532
9 Claims. (Cl. 23—15)

This invention relates to a treatment of vanadum-bearing ores or concentrates for the recovery of vanadium oxide in a pure form containing in excess of 99.5% $V_2O_5$.

In the treatment of ores or concentrates containing vanadium for the recovery of vanadium values, it had been the custom of the industry to crush the ores to a suitable fineness, such as less than minus 60 mesh, and to roast the ore in suitable roasting furnaces with the addition of sodium salts such as sodium carbonate, sodium sulfate or sodium chloride, at temperatures approximately 800° C. whereupon a major portion of the vanadium contained in the ore is converted to a water soluble salt, i.e., sodium vanadate. Upon subjecting the roasted material to leaching action with water, the water soluble sodium vanadate is separated from the residual solids by filter means and the residue solids discharged to tailing piles.

Conventionally, the vanadium is recovered from such a solution by subjecting the solution to boiling temperatures and with the addition of mineral acids, whereupon a compound of vanadium known as "red cake" separates from the solution as a solid and is removed by filtration means. The remaining solution contains acid, sodium sulfate, phosphorus and other impurities and is discarded to waste. The "red cake" is subjected to drying and heating to produce a product containing from 87% to 96% $V_2O_5$ and usually from 2% to 10% sodium as $Na_2O$, 20% silica as $SiO_2$, .05% phosphorus, .25% sulfur and .10% iron. This is smelted to produce fero-vanadium and finds a market in the alloy steel industry where the contained impurities are not objectionable.

In recent years, and especially in the past five years, there has been a growing use for pure vanadium oxide in the making of non-ferrous alloys, such as in metals containing titanium, chromium, vanadium and aluminum, where sodium, iron, silica and phosphorus content in the metal must be kept below the limits contained in conventional "red cake" or fused oxide. Usually this requires a pure vanadium oxide containing more than 99.5% $V_2O_5$ and less than .10% of sodium and .25% of silica and less than .01% each of phosphorus, chromium and iron. Vanadium oxide of this purity has been obtained by purifying and rerefining the impure "red cake" output of conventional plants, by the use of ammonium chloride.

For instance, one method consists in mixing the "red cake" with a hot solution of sodium carbonate under oxidizing conditions whereby the vanadium redissolves as sodium vanadate and the largest part of the iron, silica, sulfur and other impurities remain in an insoluble form. The soluble vanadium is then separated from the insoluble impurities by filtration means in a concentrated solution containing usually about 8% $V_2O_5$. Pure ammonium chloride is then added to the solution in such a quantity as to form ammonium metavanadate ($NH_4VO_3$) and an additional amount sufficient to produce an 8% to 10% ammonium chloride solution. Under these conditions, ammonium metavanadate becomes insoluble and is separated from the sodium-bearing solution by filter means. After washing the ammonium metavanadate free of soluble sodium salts in cold water, the pure salt is dried and heated to expel ammonia, leaving pure $V_2O_5$.

Another method of recovery of vanadium contained in the solution from leaching calcines is revealed in co-pending applications, Serial Nos. 141,340, now Patent No. 3,206,276 granted September 14, 1965, and 141,500, now Patent No. 3,206,277 granted September 14, 1965, in which the aqueous extract solution is mixed with an organic solution containing a water insoluble tertiary or quaternary amine dissolved in a suitable solvent whereby the vanadium content of the aqueous solution is extracted into the organic phase as a vanadium amine organic complex and separated from the aqueous solution by settling. The vanadium content of the organic solution is then recovered by mixing with an aqueous solution contaning ammonia and ammonium chloride of a concentration not less than 80 grams per liter of ammonium chloride whereby the vanadium forms the insoluble ammonia metavanadate of the composition $NH_4VO_4$ in the aqueous phase and is recovered by filtration means from the separated aqueous stripping solution. The ammonia metavanadate is then dried and heated to expel ammonia producing pure oxide in excess of 99.5 percent $V_2O_5$.

Ammonium chloride is an essential chemical used in producing pure vanadium oxide from sodium vanadate solutions by the methods described. It is also a major part of the cost of such operations as the price of the salt is from 7 to 8 cents per pound. Usually ammonium chloride is produced in chemical plants at a great distance from mining areas where vanadium is produced, requiring costly transportation and handling costs. In addition, large amounts of ammonium chloride must be used in the solutions to precipitate ammonia metavanadate, usually from 2 to 3 pounds per pound of $V_2O_5$ recovered, and it must be used in a concentrated solution.

It is an object of this invention to provide a simple, economical and efficient procedure for producing ammonium chloride in a vanadium processing plant in a concentrated and usable form for use in the same processing operation to obtain the production of pure vanadium oxide in a continuous manner at low cost.

Another object of my invention is to reduce corrosion and installation and maintenance costs of plant processes for producing pure vanadium oxide.

The practice of my invention will be described with reference to the accompanying figure showing a flow sheet illustrating a typical plant circuit for the practice of this invention. As shown in the figure, a supply of vanadium ore or concentrates ground to a suitable state of fineness, such as minus 100 mesh, is delivered from a suitable storage receptacle 2, such as an ore bin, into a roaster 4. A charge of salt (NaCl) is mixed with the ore passing to the roaster as shown at 3, and preferably is fed in the approximate proportion of 30% salt to 70% ore. The roasting is performed under oxidizing conditions by supply of oxygen, preferably air, delivered to the roasting step as indicated at 4b. Any suitable fuel may be utilized as the source of heat input as shown at 4a. The roasting preferably is performed in a multiple hearth furnace.

In the roasting of vanadium ores or residues with salt, large amounts of chloride and hydrochloric acid are evolved in the roaster gases as the result of the reaction of the salt on the various compounds of vanadium in the ore typified by the following overall reactions:

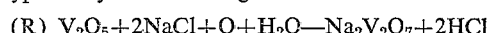
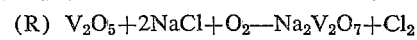

This acid gas is corrosive and objectionable because it results in air pollution and destruction of vegetation when discharged into the atmosphere. As covered by Patent No. 2,576,101 (Burwell), it is possible to recover hydrochloric acid as a weak acid by scrubbing the hot gases with water in a conventional gas scrubbing operation. This week acid is then used to leach uranium and vanadium from roaster tailings. Due to the temperature of the hot gases and of the resulting scrubbing solutions, it is impossible to build up the strength of the hydrochloric acid much above 5 percent due to the boiling point of aqueous hydrochloric acid at temperatures of the scrubbing solution.

I have found that a concentrated solution of ammonium chloride can be produced by scrubbing the hot chlorine-bearing furnace gases in a scrubber 5 with a solution of ammonium chloride to which ammonia is added at stage 6 to maintain a pH of preferably not more than 5. Under these conditions, the chlorine in the gas is reacted as fast as it is absorbed in a non-corrosive solution to form ammonium chloride. In addition to the formation of ammonium chloride in the scrubber solution, the solution is evaporated by the hot furnace gases which results in the concentration of ammonium chloride to the desired amount required in forming and precipitating ammonia metavanadate from vanadium solutions to yield a pure $V_2O_5$ product.

I have found that a concentration of 200 to 250 grams of $NH_4Cl$ per liter can be easily obtained by this combination of chlorine neutralization, scrubbing and evaporation. At the desired concentration, the concentrated ammonium chloride solution can be drawn off for use in a later stage of the plant circuit and fresh water may be added to the quantity required to maintain the scrubber circuit as shown at 7.

It is desirable to maintain the pH of the scrubber solution below neutral such as a pH of 5. The reason for this is that a higher pH, such as above 7 or 8, results in a loss of ammonia and the formation of an ammonium chloride mist, which reduces the recovery of ammonium chloride and increases the consumption of ammonia.

In the formation of ammonium chloride in this manner, according to the reaction

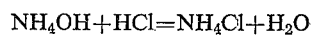

$$NH_4OH + HCl = NH_4Cl + H_2O$$

requires .318 pound of $NH_3$ to produce 1 pound of $NH_4Cl$. As the cost of anhydrous ammonia is usually less than 5 cents per pound, the resulting cost of ammonium chloride is less than 2 cents per pound or approximately 25 percent of the cost of purchased material.

Before using the concentrated ammonium chloride solution in the recovery of $V_2O_5$ from its solutions, it is necessary to clarify the solution by filter means as shown at stage 8. As some of the ores or concentrates contain phosphorus, a small amount of phosphorus from the dust may contaminate the concentrated solution as a soluble salt. I have found that the addition of a small amount of a magnesium salt, such as magnesium chloride or sulphate, or magnesium oxide introduced into the solution as shown at 9, together with the adjustment of pH to at least 8, will remove the soluble impurities as ammonium magnesium phosphate which can be removed by further steps in the clarification process.

The calcine discharged from roaster 4 is subjected to water leaching at stage 10 to extract the vanadium content in solution and then passed to a filtration stage or step 11 from which the solids are discharged to waste as shown at 12 and the aqueous solution containing sodium vanadate is conducted through a line 13 for mixing with an organic extract solution at stage 14. I have found that an organic solution of a tertiary or quaternary amine is an effective extraction medium in forming a water insoluble vanadium amine complex. The organic solution is separated from the aqueous solution at 15 with the aqueous solution discharged to waste as shown at 16.

The organic solution is next mixed with ammonium hydroxide solution at stage 17 and the resulting aqueous solution is separated and discharged at 18 for return as part of the ammonium addition to stage 6, while the organic solution so separated is discharged at 19 for mixing with the concentrated ammonium chloride solution passing from stage or step 8 into a mixing stage 20. This mixing extracts ammonium metavanadate as a water-insoluble precipitate in an aqueous solution, and the mixture is passed to a treatment stage 21 in which the organic solution is separated from the aqueous solution. The organic solution is returned for use in stage 14 and requires only small or periodic additions for continuous circuiting in this manner.

The aqueous solution containing vanadium discharges from separation stage 21 as feed to a filtration stage 22 and the solids discharge of filtration comprising the ammonium metavanadate product is charged to a roaster 23, and the calcine passing from the roaster is pure vanadium oxide as previously described. The roaster gases may be treated for ammonia recovery and reuse in the process when desired. The ammonium chloride solution separated by filtration preferably is recycled through a line 24 to scrubber stage 5.

It will be apparent from the foregoing description of the circuiting practices that the treatment includes a number of innovations in the production of pure vanadium oxide which contribute to the efficiency and economy of the process. In particular, the feature of utilizing compositions which are present at one stage of the operation as a product for waste are utilized through the recycling procedures as a supply of required materials in another stage of the operation. The utilization of the roaster gases to form the required ammonium chloride of the treatment and the utilization of the heat as a concentrating media contributes substantially to the efficiency of the operation.

Another advantage derives from the recycling and reuse of the organic solution and the collection of ammonium chloride solutions in various concentrations for reuse at other stages where such content is required greatly assist the economy of the processing. Having described typical procedures for the practice of the invention, certain test operations will now be described by way of further illustration of the practice of the invention.

EXAMPLE I

An example of the application of this invention follows: 200 tons of vanadium-bearing concentrates containing 12.5% $V_2O_5$ was ground to minus 100 mesh and mixed with 30 percent of salt. The mixture was roasted in a multiple hearth furnace for 30 minutes at a temperature of 780° C., cooled and leached with water. The roaster gases were passed through a 4 compartment scrubber where they were washed with a circulating solution containing ammonium chloride. The pH of the scrubber solution was maintained at 5 by the addition of anhydrous ammonia to the scrubber circuit. The scrubber solution was recirculated until the concentration of the solution was 24 percent $NH_4Cl$. 23,900 pounds of $NH_4Cl$ were recovered in the scrubber solution and 8100 lbs. of $NH_3$ were consumed in the scrubber solution. The temperature of the furnace gases was 425° C. entering the scrubber and 90° leaving the scrubber. 55,000 pounds of water was evaporated from the scrubber solution. Twenty-five pounds of magnesium chloride was added to a portion of the scrubber solution and the pH adjusted to 8. The solution was then filtered in a pressure filter and the clarified solution used to extract the vanadium contained in an organic solution of a quaternary amine which had been used to extract the vanadium from the water leach solution of the roasted calcine in accordance with copending application Serial No. 141,340, now Patent No. 3,206,276.

The vanadium extracted from the organic solution by the aqueous scrubber solution containing ammonium chloride was separated by filtration means and calcined to remove ammonia. The resulting vanadium oxide contained 99.6 percent $V_2O_5$, .05% $Na_2O$, .09% SiO and .01% each of phosphorous and iron. The ammonium chloride solution from which the vanadium had been recovered as a pure oxide was returned to the scrubber circuit in a cyclic manner.

EXAMPLE II

In another small scale test, one liter of aqueous vanadium-bearing leach solution obtained by leaching a roasted calcine and containing 60 grams of $V_2O_5$ per liter was mixed with 500 ml. of scrubber solution containing 24 percent ammonium chloride. Ninety-nine percent of the vanadium contained in the solution was separated as an insoluble ammonium metavanadate by filtration and calcined to pure oxide containing 99.72% $V_2O_5$, .02% $Na_2O$, .10% $SiO_2$ and .01% each of $P_2O_5$ and FeO.

From the foregoing description of the practice of my invention, it will be apparent that the novel practices and procedures of my invention are effective in producing a high purity vanadium oxide in an efficient manner and at low cost. The practice of my invention as illustrated and described herein is intended as an illustration of typical procedure and changes and variations in the steps and treatments may be availed of within the scope of the invention as set forth in the hereunto appended claims.

I claim:

1. In a process of recovering pure vanadium oxide containing not less than 99.5% $V_2O_5$ from vanadium ores or concentrates, including the stages of roasting such a vanadium-bearing material containing some silica, chromium and iron and substantially no phosphorus as impurities, said material being mixed with sodium chloride so as to form water soluble sodium vanadate substantially free of silicon, iron, chromium and phosphorus during roasting, water leaching the roast calcine, filtering the resulting slurry for separation of the sodium vanadate solution from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, extracting the vanadium ion from the separated organic phase as crystalline ammonium metavanadate by mixing with an aqueous solution containing ammonium chloride and ammonia, and subjecting the crystalline ammonium metavanadate to heating to form pure vanadium pentoxide containing not less than 99.5% pure $V_2O_5$, the improvement which comprises scrubbing roaster gases with a water solution containing ammonia and ammonium chloride so as to convert the chlorine and hydrochloric acid in the roaster gases to ammonium chloride, recycling a portion of the scrubbed solution from the scrubbing stage after adding additional ammonia to replace the ammonia consumed in the scrubber gas and in removing water in the hot gases, thereby effecting a concentration of ammonium chloride in the solution passing from scrubbing to not less than ten percent $NH_4Cl$, and introducing the remaining portion of the scrubber solution so concentrated into the stage for extracting the vanadium anion from the separated organic phase.

2. In a process of recovering pure vanadium oxide containing not less than 99.5% $V_2O_5$ from vanadium ores or concentrates, including the stages of roasting such a vanadium-bearing material containing some silica, chromium and iron and substantially no phosphorus as impurities, said material being mixed with sodium chloride so as to form water soluble sodium vanadate substantially free of silicon, iron, chromium and phosphorus during roasting, water leaching the roast calcine, filtering the resulting slurry for separation of the sodium vanadate solution from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, extracting the vanadium ion from the separated organic phase as crystalline ammonium metavanadate by mixing with an aqueous solution containing ammonium chloride and ammonia, and subjecting the crystalline ammonium metavanadate to heating to form pure vanadium pentoxide containing not less than 99.5% pure $V_2O_5$, the improvement which comprises scrubbing roaster gases with a water solution containing ammonia and ammonium chloride so as to convert the chlorine and hydrochloric acid in the roaster gases to ammonium chloride, recycling a portion of the scrubbed solution from the scrubbing stage after adding additional ammonia to replace the ammonia consumed in the scrubber gas and in removing water in the hot gases, thereby effecting a concentration of ammonium chloride in the solution passing from scrubbing to not less than ten percent $NH_4Cl$, introducing the remaining portion of the scrubber solution so concentrated into the stage for extracting the vanadium anion from the separated organic phase, and recycling ammonium chloride solution separated from the crystalline ammonium metavanadate into the ammonia chloride solution introduced into the scrubbing stage.

3. In a process of recovering pure vanadium oxide containing not less than 99.5% $V_2O_5$ from vanadium ores or concentrates, including the stages of roasting such a vanadium-bearing material containing some silica, chromium and iron and substantially no phosphorus as impurities, said material being mixed with sodium chloride so as to form water soluble sodium vanadate substantially free of silicon, iron, chromium and phosphorus during roasting, water leaching the roast calcine, filtering the resulting slurry for separation of the sodium vanadate solution from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, extracting the vanadium ion from the separated organic phase as crystalline ammonium metavanadate by mixing with an aqueous solution containing ammonium chloride and ammonia, and subjecting the crystalline ammonium metavanadate to heating to form pure vanadium pentoxide containing not less than 99.5% pure $V_2O_5$, the improvement which comprises scrubbing roaster gases with a water solution containing ammonia and ammonium chloride so as to convert the chlorine and hydrochloric acid in the roaster gases to ammonium chloride, recycling a portion of the solution passing from the scrubbing stage through said stage after adding additional ammonia to replace the ammonia consumed in the scrubber gases and in removing water in the hot gases of the preceding cycle and supplying another portion of the solution passing from scrubbing as the solution for mixing with the organic solution at the vanadium extraction stage, purifying the organic solution of the two-phase liquid mixture by mixing ammonium hydroxide solution therewith, separating the purified organic solution from associated aqueous solution, and introducing the purified organic solution into the vanadium extraction stage.

4. In a process of recovering pure vanadium oxide containing not less than 99.5% $V_2O_5$ from vanadium ores or concentrates, including the stages of roasting such a vanadium-bearing material containing some silica, chromium and iron and substantially no phosphorus as impurities, said material being mixed with sodium chloride so as to form water soluble sodium vanadate substantially free of silicon, iron, chromium and phosphorus during roasting, water leaching the roast calcine, filtering the resulting slurry for separation of the sodium vanadate solution from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, extracting the vanadium ion from the separated organic phase as crystalline ammonium metavanadate by mixing with an aqueous solution containing ammonium chloride and ammonia, and subjecting the crystalline ammonium metavanadate to heating to form pure vanadium pentoxide containing not less than 99.5% pure $V_2O_5$, the improvement which comprises scrubbing roaster gases with a water solution containing ammonia and ammonium chloride so as to convert the chlorine and hydrochloric acid in the roaster gases to ammonium chloride, recycling a portion of the solution passing from the scrubbing stage through said stage after adding additional ammonia to replace the ammonia consumed in the scrubber gases and in removing water in the hot gases of the preceding cycle and supplying another portion of the solution passing from scrubbing as the solution for mixing with the organic solution at the vanadium extraction stage, purifying the organic solution of the two-phase liquid mixture by mixing ammonium hydroxide solution therewith, separating the purified organic solution from associated aqueous solution, introducing the purified organic solution into the vanadium, extraction stage, and introducing the aqueous solution separated from the organic solution as ammonia recycle to scrubbing.

5. In a process of recovering pure vanadium oxide containing not less than 99.5% $V_2O_5$ from vanadium ores or concentrates, including the stages of roasting such a vanadium-bearing material containing some silica, chromium and iron and substantially no phosphorus as impurities, said material being mixed with sodium chloride so as to form water soluble sodium vanadate substantially free of silicon, iron, chromium and phosphorus during roasting, water leaching the roast calcine, filtering the resulting slurry for separation of the sodium vanadate solution from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, extracting the vanadium ion from the separated organic phase as crystalline ammonium metavanadate by mixing with an aqueous solution containing ammonium chloride and ammonia, and subjecting the crystalline ammonium metavanadate to heating to form pure vanadium pentoxide containing not less than 99.5% pure $V_2O_5$, the improvement which comprises scrubbing roaster gases with a water solution containing ammonia and ammonium chloride having a pH of not more than 5 so as to convert the chlorine and hydrochloric acid in the roaster gases to ammonium chloride, recycling a portion of the scrubbed solution from the scrubbing stage after adding additional ammonia to replace the ammonia consumed in the scrubber gas and in removing water in the hot gases, thereby effecting a concentration of ammonium chloride in the solution passing from scrubbing to not less than ten percent $NH_4Cl$, and introducing the remaining portion of the scrubber solution so concentrated into the stage for extracting the vanadium anion from the separated organic phase.

6. The process of recovering pure vanadium oxide containing not less than 99.5% $V_2O_5$ from vanadium ores or concentrates having substantially no phosphorus content as an impurity, which comprises the stages of roasting such a ground material with sodium chloride under oxidizing conditions, water leaching the roast calcine, filtering the resulting slurry for separation of the sodium vanadate solution from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, purifying the separated organic solution by mixing ammonium hydroxide solution therewith, separating the purified organic solution from associated aqueous solution, scrubbing roaster gases with water containing ammonia and ammonium chloride and having a pH of not more than 5 so as to convert the chlorine and hydrochloric acid in said gases to ammonium chloride, recycling a portion of the scrubbed solution from the scrubbing stage after adding additional ammonia to replace the ammonia consumed in the scrubber gas and in removing water in the hot gases, thereby effecting a concentration of ammonium chloride in the solution passing from scrubbing to not less than 10% $NH_4Cl$, mixing the purified organic solution containing vanadium with the remaining portion of the more concentrated ammonium chloride solution passing from scrubbing so as to extract crystalline ammonium metavanadate in aqueous solution, separating the organic solution from the aqueous solution containing the ammonium metavanadate crystals, separating said crystals from the ammonium chloride solution, returning the solution so separated as part of the ammonia addition to the scrubber solution, recycling the separated organic solution to the liquid-to-liquid ion exchange stage, and subjecting the separated ammonium metavanadate crystals to heating so as to form pure vanadium pentoxide containing not less than 99.5% $V_2O_5$.

7. The process of recovering pure vanadium oxide containing not less than 99.5% $V_2O_5$ from vanadium ores or concentrates having some silica, iron, chromium and phosphorus impurities, which comprises the stages of roasting such a ground material with sodium chloride under oxidizing conditions, water leaching the roast calcine, filtering the resulting slurry for separation of the sodium vanadate from insolubles, extracting the anionic vanadium oxide component in the aqueous leach solution into a liquid-to-liquid ion exchange organic solution to obtain a two-phase liquid mixture, separating the aqueous phase from the organic phase of the two-phase mixture, purifying the separated organic solution by mixing ammonium hydroxide solution therewith, separating the purified organic solution from associated aqueous solution, scrubbing roaster gases with water containing ammonia and ammonium chloride and having a pH of not more than 5 so as to convert the chlorine and hydrochloric acid in said gases to ammonium chloride, recycling a portion of the scrubbed solution from the scrubbing stage after adding additional ammonia to replace the ammonia consumed in the scrubber gas and in removing water in the hot gases, thereby effecting a concentration of ammonium chloride in the solution passing from scrubbing to not less than 10% $NC_4Cl$, clarifying the remaining portion of the scrubbed solution from the scrubbing stage by introducing an inorganic magnesium salt therein and filtering for removal of insolubles containing phosphorus impurities, mixing the purified organic solution with the clarified ammonium chloride solution so as to extract crystalline ammonium metavanadate in aqueous solution, separating the organic solution from the aqueous solution containing the ammonium metavanadate crystals, separating said crystals from the ammonium chloride solution, returning the solution so separated as part of the ammonia addition to the scrubber solution, recycling the separated organic solution to the liquid-to-liquid ion exchange stage, and subjecting the separated ammonium metavanadate crystals to heating so as to form pure vanadium pentoxide containing not less than 99.5% $V_2O_5$.

8. A process for the recovery of pure vanadium oxide containing not less than 99.5% $V_2O_5$ from vanadium ores or concentrates having some phosphorus impurities, which includes the steps of roasting such a ground material with sodium chloride under oxidizing conditions, water leaching the resulting water soluble salts from the roasted material, absorbing the chlorine and hydrochloric acid content of the roaster gases in a solution containing ammonium chloride and maintained at a pH not exceeding 7 by additions of ammonia, clarifying the ammonium chloride solution by introducing an inorganic magnesium salt therein, and filtering for removal of the insolubles containing phosphorus impurities, recycling some of the ammonium chloride solution through absorbing towers in contact with hot roaster gases for cencentrating the ammonium chloride solution to contain not less than 10% $NH_4Cl$, extracting vanadium from the aqueous leach solution as a vanadium bearing organic solution of a tertiary or quaternary amine, mixing said organic solution with the concentrated ammonium chloride solution after clarification to precipitate purified ammonium metavanadate, separating said ammonium metavanadate from associated solution by filtration, and calcining the separated ammonium metavanadate to pure vanadium oxide containing in excess of 99.5% $V_2O_5$.

9. A process for the recovery of pure vanadium oxide containing not less than 99.5% $V_2O_5$ from vanadium ores or concentrates having some phosphorus impurities, which includes the steps of roasting such a ground material with sodium chloride under oxidizing conditions, water leaching the resulting water soluble salts from the roasted material, absorbing the chlorine and hydrochloric acid content of the roaster gases in a solution containing ammonium chloride and maintained at a pH not exceeding 7 by additions of ammonia, clarifying the ammonium chloride solution by introducing an inorganic magnesium salt therein, and filtering for removal of the insolubles containing phosphorus impurities, recycling some of the ammonium chloride solution through absorbing towers in contact with hot roaster gases for concentrating the ammonium chloride solution to contain not less than 10% $NH_4Cl$, extracting vanadium from the aqueous leach solution as a vanadium bearing organic solution of a tertiary or quaternary amine, mixing said organic solution with the concentrated ammonium chloride solution after clarification to precipitate purified ammonium metavanadate, separating said ammonium metavanadate from associated solution by filtration, calcining the separated ammonium metavanadate to pure vanadium oxide containing in excess of 99.5% $V_2O_5$, and recycling the ammonium chloride solution so separated through the gas absorbing step.

References Cited by the Examiner

UNITED STATES PATENTS

| | | | |
|---|---|---|---|
| 1,223,567 | 4/1917 | Davis | 23—19.1 |
| 2,357,466 | 9/1944 | Frick | 23—19.1 |
| 3,063,795 | 11/1962 | Smith | 23—51 |
| 3,083,085 | 3/1963 | Lewis et al. | 23—22 X |
| 3,206,276 | 9/1965 | Burwell et al. | 23—18 |
| 3,206,277 | 9/1965 | Burwell et al. | 23—18 |

MILTON WEISSMAN, *Primary Examiner.*

OSCAR R. VERTIZ, *Examiner.*

H. T. CARTER, *Assistant Examiner.*